Oct. 22, 1957  L. S. ABRAMS  2,810,602
VEHICLE BODY HAVING LONGITUDINALLY SPACED FIXED LOAD SUPPORTS
Filed Nov. 18, 1954  2 Sheets-Sheet 1
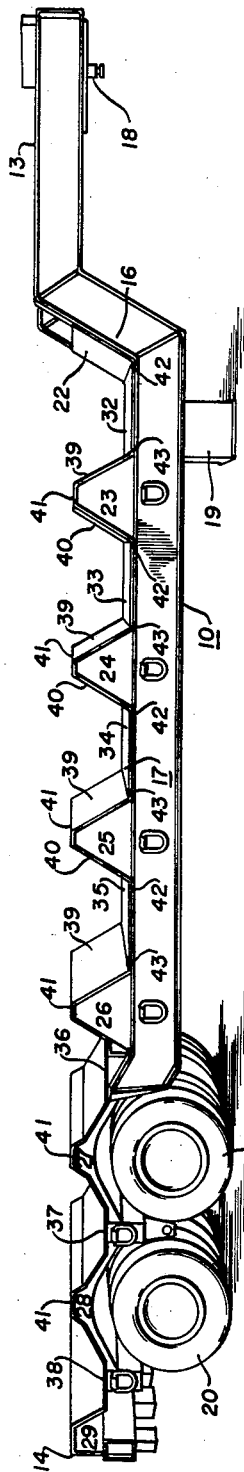
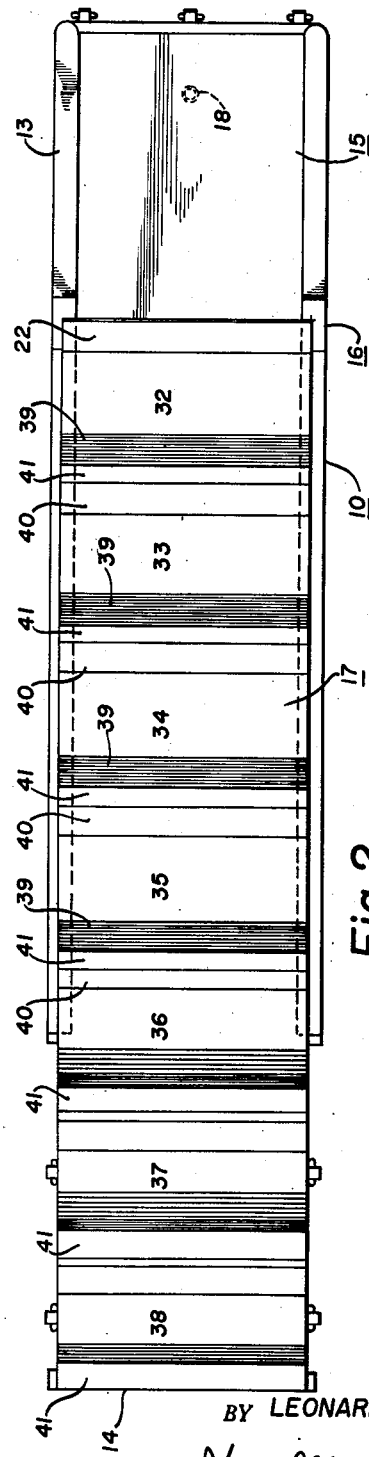
INVENTOR.
BY LEONARD S. ABRAMS Oct. 22, 1957 L. S. ABRAMS 2,810,602
VEHICLE BODY HAVING LONGITUDINALLY SPACED FIXED LOAD SUPPORTS
Filed Nov. 18, 1954 2 Sheets-Sheet 2
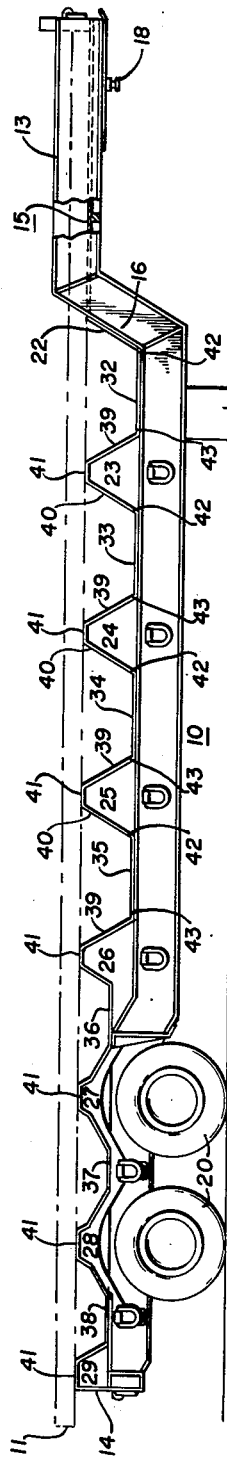
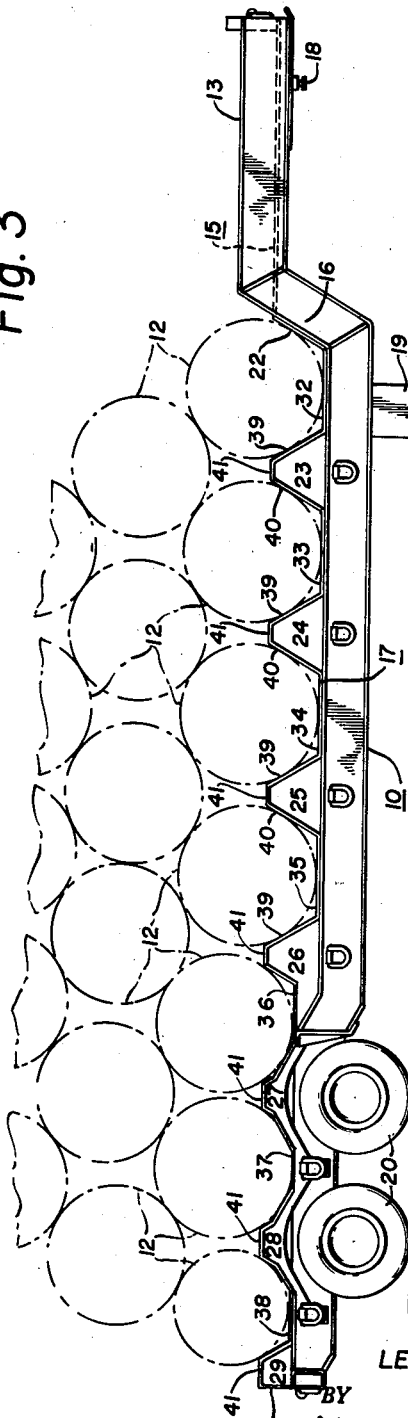
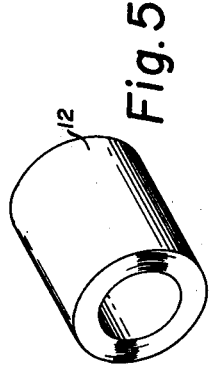
INVENTOR.
LEONARD S. ABRAMS

United States Patent Office 2,810,602
Patented Oct. 22, 1957

2,810,602

VEHICLE BODY HAVING LONGITUDINALLY SPACED FIXED LOAD SUPPORTS

Leonard S. Abrams, Cleveland, Ohio

Application November 18, 1954, Serial No. 469,658

2 Claims. (Cl. 296—25)

The invention relates in general, to bodies for vehicles and more particularly to trailer bodies adapted to carry long articles disposed longitudinally of the vehicle and for carrying rolls of material with their axes disposed transversely of the vehicle.

An object of the invention is the provision of a trailer body having an upper and a lower deck with a plurality of spaced stands mounted on the lower deck whereby the top of the stands and the upper deck are substantially in the same plane for carrying long articles disposed longitudinally of the vehicle and whereby the deck spaces between the stands in combination with the sides of the stands provide troughs for carrying respectively the rolls of material with their axes disposed transversely of the vehicle.

Another object of the invention is the provision of a trailer deck body which may carry long articles disposed longitudinally of the vehicle, as well as carry rolls of material with their axes disposed transversely of the vehicle.

Another object of the invention is the provision of a trailer body having a plurality of troughs for carrying rolls of material with their axes disposed transversely of the vehicle wherein the top surface of the compartments lie in a plane for carrying long articles disposed longitudinally of the vehicle.

Another object of the invention is the provision of a trailer body having an upper deck and a lower deck with a plurality of stands arranged on the lower deck for carrying rolls of material therebetween with their axes disposed transversely of the vehicle wherein the top surfaces of the stands and the upper deck lie in substantially the same plane for carrying long articles disposed longitudinally of the vehicle.

Other objects and a fuller understanding of this invention may be had by referring to the following description and claims, taken in conjunction with the accompanying drawing, in which:

Figure 1 is a perspective view of a trailer body embodying the features of the invention;

Figure 2 is a plan view of the trailer body;

Figure 3 is a side elevational view of the trailer body showing a long article disposed longitudinally of the vehicle;

Figure 4 is a side view of the trailer body showing rolls of material with their axes disposed transversely of the vehicle; and Figure 5 is a view of a roll of material adapted to be carried by the trailer body.

With reference to the drawing, the trailer body is indicated generally by the reference character 10 and as shown in Figure 3, the trailer body may carry long articles indicated by the reference character 11 or, as shown in Figure 4, the trailer body may carry rolls of material 12 having their axes disposed transversely of the vehicle. The Figure 5 shows a roll of material such as may be carried by the trailer body. The rolls of material may comprise steel or any other material. The long articles may comprise steel plates, bars, or other long items.

The front of the trailer body is indicated by the reference character 13 and the rear end of the body is indicated by the reference character 14. The entire trailer body 10 comprises an upper deck portion 15, an intermediate portion 16, and a lower deck portion 17. The upper deck portion 15 is between the front end 13 of the body and the intermediate portion 16. The lower deck portion 17 is between the intermediate portion 16 and the rear end 14 of the body. The intermediate portion 16 interconnects the upper deck portion 15 and the lower deck portion 17.

Mounted on the underside of the upper deck portion 15 is a king pin 18 for fastening the trailer to a truck for pulling the trailer. Any suitable means may be employed for connecting the truck to the king pin. The lower deck portion 17 is provided on its underneath side with a rest support 19 which may be of any suitable construction so that when the trailer is unattached from the truck, the front end of the trailer is supported from the ground. As the truck is mounted to the king pin 18, suitable hydraulic lift means is provided for raising the front end of the trailer body from the ground so that the rest support 19 also clears the ground when the trailer is pulled by the truck. The lower deck portion 17 at its rearward end is provided with suitable wheels 20 for the trailer body.

The intermediate portion 16 has panel 22 extending upwardly from the lower deck portion 17 and slopes towards the front end of the vehicle. The panel 22 faces towards the rear end of the vehicle. A plurality of stands 23, 24, 25, 26, 27, 28 and 29 extend transversely of the lower deck portion 17 and are mounted thereon. The stands are longitudinally spaced from each other along the lower deck portion and provide deck space between adjacent stands. The deck space is indicated by the reference characters 32, 33, 34, 35, 36, 37 and 38. Each of said stands has a first and second side wall 39 and 40 and a top wall 41. The first and second sides 39 and 40 of each of said stands extend upwardly of said lower deck portion and converge towards each other in a direction towards the top wall 41. The first side wall 39 of each of said stands faces towards the front of the vehicle and the second side wall 40 of each of said stands faces towards the rear of the vehicle. The first side wall 39 of the stand 23 and the side wall 22 of the intermediate portion 16 are spaced from each other and provide a deck space 32 therebetween.

As illustrated, each of the deck spaces has forward and rearward ends indicated by the reference characters 42 and 43 respectively. The forward end 42 of each of said deck spaces is bounded by a side wall facing towards the rear of the vehicle and the rearward end of each said deck space is bounded by a side wall facing towards the front of the vehicle. Each of said deck spaces in combination with the side walls of the stands form a trough for carrying the rolls of material 12 with their axes disposed transversely of the vehicle. The troughs are of the same general shape except those over the wheels 20. The rear wall of the rear stand 29 constitutes the end wall of the vehicle.

The upper deck portion 15 and the top walls 41 of the plurality of stands lie in substantially the same plane for carrying long articles longitudinally of the vehicle; see Figure 3 of the drawing.

In operation, the vehicle may be used at one time to carry a plurality of rolls of material with their axes disposed transversely of the vehicle, such as shown in Figure 4, and at other times the same vehicle body may be used for carrying long articles, such as steel plates, bars, or other items, longitudinally of the vehicle, as shown in Figure 3. The entire structure of the trailer body is of a rugged nature and is provided with necessary beams, cross members and braces to carry the entire weight imposed upon the body. In actual practice, the entire trailer body from the front end 13 to the rear end 14 may be in the neighborhood of forty feet and the spacing and the size of the compartments may be sufficient to carry rolls of material substantially four feet in diameter. This trailer is designed to carry as much as 90,000 to 100,000 pounds. The Figure 4 shows individual rolls or coils of steel in each of the compartments and these coils in combination with each other, provide along their upper surface additional troughs for carrying a second or possibly a third tier of coils depending upon the size of the coils.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A body for a vehicle for carrying long articles disposed longitudinally of the vehicle and for carrying rolls of material with their axes disposed transversely of the vehicle, said body having a front end and a rear end and comprising a forward upper deck portion, an inclined intermediate portion, and a rearward lower deck portion, said inclined intermediate portion interconnecting said upper deck portion and said lower deck portion and having an inclined panel extending upwardly from said lower deck, a plurality of stands extending transversely of the lower deck portion and mounted thereon, said stands being longitudinally spaced from each other along said lower deck portion and each having a top wall and upwardly and inwardly inclined side walls, pairs of said stands and said inclined panel and its adjacent stand forming troughs for carrying said rolls with their axes disposed transversely of the vehicle, said upper deck portion, and said top walls of said stands lying in substantially the same plane for carrying said long articles longitudinally of the vehicle.

2. A body for a vehicle for carrying long articles disposed longitudinally of the vehicle and for carrying rolls of material with their axes disposed transversely of the vehicle, said body having a front end and a rear end and comprising a forward upper deck portion, an inclined intermediate portion, and a rearward lower deck portion, said inclined intermediate portion interconnecting said upper deck portion and said lower deck portion and having an inclined panel extending upwardly from said lower deck, a plurality of stands extending transversely of the lower deck portion and mounted thereon, said stands being longitudinally spaced from each other along said lower deck portion and each having a top wall and side walls, pairs of said stands and said inclined panel and its adjacent stand forming troughs for carrying said rolls with their axes disposed transversely of the vehicle, said upper deck portion, and said top walls of said stands lying in substantially the same plane for carrying said long articles longitudinally of the vehicle.

References Cited in the file of this patent
UNITED STATES PATENTS

| | | |
|---|---|---|
| 1,937,617 | Willoughby | Dec. 5, 1933 |
| 2,169,500 | Reid | Aug. 15, 1939 |
| 2,494,404 | Nixon | Jan. 10, 1950 |
| 2,498,229 | Adler | Feb. 21, 1950 |